United States Patent [19]

Feliu

[11] Patent Number: 4,764,952
[45] Date of Patent: Aug. 16, 1988

[54] TELECOMMUNICATIONS DEVICE FOR READING POWER METERS

[76] Inventor: Horace G. Feliu, 1708 Ferdinand, Coral Gables, Fla. 33134

[21] Appl. No.: 27,534

[22] Filed: Mar. 18, 1987

[51] Int. Cl.$^4$ ............................................. H04M 11/00
[52] U.S. Cl. ......................................... 379/107; 379/40
[58] Field of Search ................... 379/107, 40, 51, 106; 340/637, 870.02, 870.03; 324/142

[56] References Cited

U.S. PATENT DOCUMENTS

| | | | |
|---|---|---|---|
| 3,962,545 | 6/1976 | Abe | 379/107 |
| 4,086,434 | 4/1978 | Bocchi | 379/107 X |
| 4,104,486 | 8/1978 | Martin et al. | 379/107 X |
| 4,241,237 | 12/1980 | Paraskevakos et al. | 379/107 X |
| 4,303,881 | 12/1981 | Czerwien et al. | 324/142 |
| 4,351,028 | 9/1982 | Peddie et al. | 379/107 X |
| 4,495,596 | 1/1985 | Sciulci | 379/107 X |
| 4,639,728 | 1/1987 | Swanson | 379/107 X |
| 4,682,169 | 7/1987 | Swanson | 379/107 X |

FOREIGN PATENT DOCUMENTS 56-14956  2/1981  Japan .................................. 324/142

Primary Examiner—Keith E. George
Attorney, Agent, or Firm—Jay Sanchelima

[57] ABSTRACT

A device for reading and transmitting the electrical energy consumption by a user through his telephone line, at predetermined time intervals. Current and voltage sensors provide an analog output that is converted to a digital output and transmitted to a general purpose computer where the necessary energy computations are made. The data is then sent to the central office through an automatic modem at a preselected time when the lines are not congested.

1 Claim, 1 Drawing Sheet

TELECOMMUNICATIONS DEVICE FOR READING POWER METERS

BACKGROUND OF THE INVENTION

1. Field of the Invention.

The present invention relates to devices for reading the electric energy consumption, and more particularly, to such devices that utilize the user's telephone connection to transmit the energy consumption to the utility's offices periodically along with other information.

2. Description of the Related Art.

Power meters are commonly read by physically sending a person to write down the readings of different users in a geographical area. This requires a small army of employees dedicated to this task with not infrequent hazardous conditions around the premises where these meters are located (dogs, etc.).

Applicant believes that the closest reference corresponds to U.S. Pat. No. 3,962,545 issued to Takeshi Abe in 1976. However, it differs from the present invention because it requires a central terminal that queries the remote terminals over the telephone lines and then the energy consumption is transmitted to the central station. This requires considerable amount of hardware and it is intended for buildings with several users in order to justify the cost of a dedicated telephone line.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an electric energy consumption meter capable of periodically transmitting the energy consumption information to the utilities office at a time designated by the user with a minimum inconvenience to him.

It is another object of this present invention to provide such a device that can detect and transmit to the utility company's offices an alarm signal whenever the power line or the meter are tampered with.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
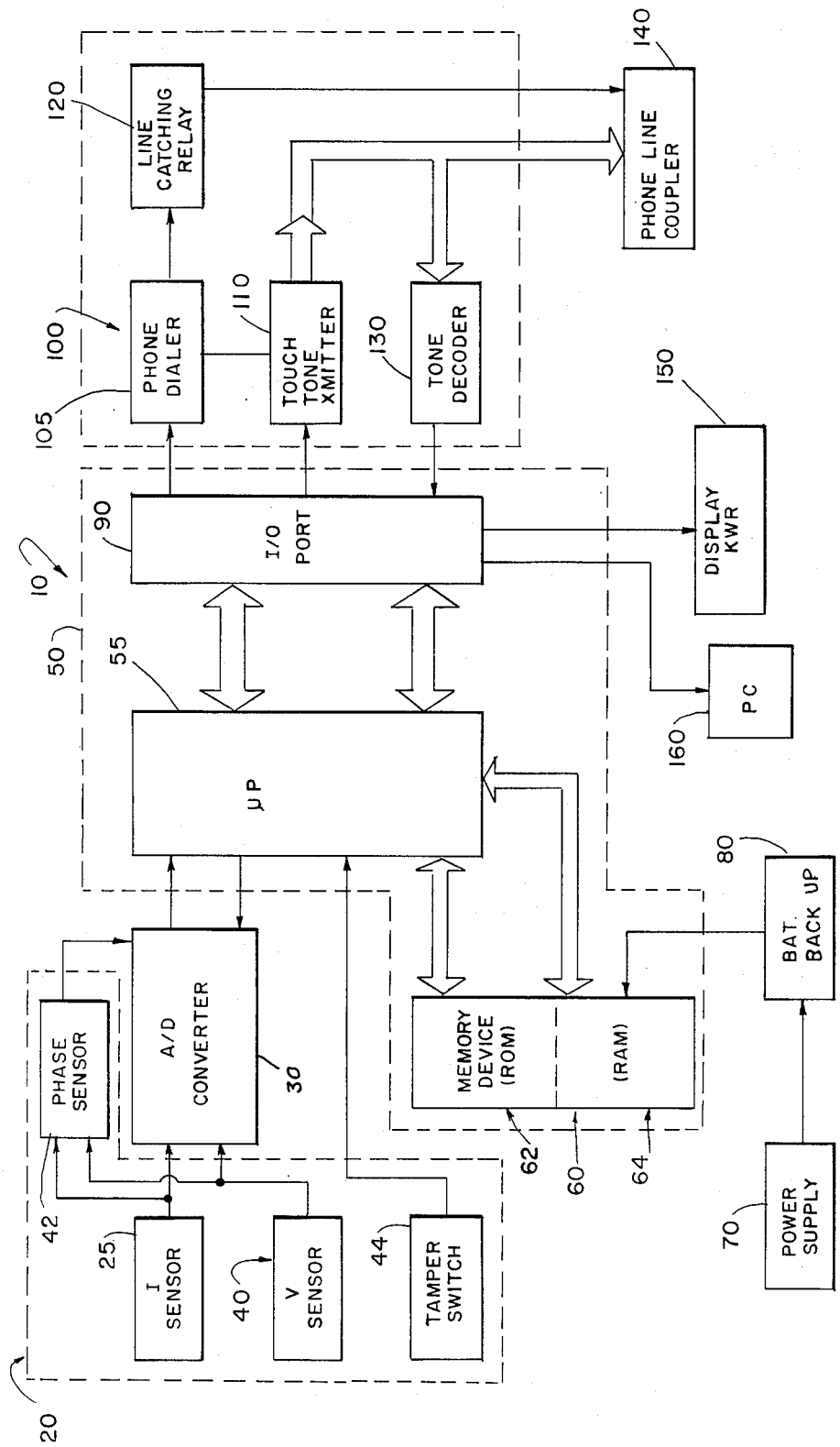
FIG. 1 represents a schematic representation of the device.

Referring now to FIG. 1, it can be observed that the device is generally referred to with numeral 10. Basically, device 10 includes a sensor assembly 20 that sends the voltage and current intensity of the electricity used to the A/D converter circuit 30 which provides the necessary digital outputs to computer means 50. Computer means 50 processes the information and sends it to modem assembly 100 which in turn transmits it to the utility company's central office.

A current intensity sensor 25 may be implemented with a sensitive coil that picks up an induced voltage proportional to the intensity of the current being consumed. This voltage may then be rectified to produce an adjusted D.C. level that may, preferably, correspond to the RMS value of the current sensed. This voltage is fed to analog to digital converter 30 which reads it and sends a digital equivalent to microprocessor chip 55.

Similarly, voltage sensor circuitry 40 processes (through a transformer) the voltage being served to a user rectified and scaled down (preferably to an RMS equivalent) so that it can be converted to a digital output by A/C converter circuit 30, and then transmitted to microprocessor 55 where the digital voltage output and the current digital output are multiplied to obtain the power being consumed and integrated over time to compute the energy consumed.

A phase sensor circuit 42 is provided to measure the phase difference between the voltage and the current. The output of sensor 42 is connected to A/D converter 30 which converts it to a digital signal proportional to the consign of the angle difference between the current and the voltage. This information is processed by microprocessor 55 to provide the "true power" instead of the "apparent power". In 3-phase systems, there are additional phase sensors for each phase.

A tamper switch circuit 44 is also provided within what is labeled as the sensor assembly 20, and, preferably, provides mechanical means for sensing any tampering of the instruments and its output is connected directly to an interrupt port of microprocessor 55. Under program control, if the interrupt is activated, a telephone call is immediately generated to annunciate tampering on the unit. If the telephone line is not available, the microprocessor will continue its attempt to make a call repetitively.

Microprocessor circuit 50 provides several functions that are accomplished with suitable software in a cost efficient fashion. These functions include a real time clock for periodically transmitting the electrical energy consumption of a user, at a predetermined time. Preferably, the transmission of this information will be preset at the early hours of the morning when the public network is not congested and, more than likely, the user is not using its telephone line. The utility company's use of the telephone line would only take a couple of minutes and the user may be given monetary incentive (possibly proportional to the cost savings caused) for allowing the company to use the lines. Microprocessor circuit 50 will also perform the necessary mathematical operations to compute the energy usage and provide a continuous output to the readout of display means 150. Another function of microprocessor circuit 50 includes the necessary hand shake exchange of control signals to acknowledge the receipt of data transmitted. Yet another function is to drive the automatic telephone dialer and touch transmitter to transmit the energy data and any tampering alarm signal.

A memory circuit 60 includes a ROM section 62 and a RAM section 64. The ROM section includes the necessary operating system software and coded identification numbers for a particular user. The memory circuit 60 is powered by the public network supply 70 and includes a battery back up package 80 in the event of power failures. Package 80 allows for the orderly shut down of microprocessor circuit 55 and, preferably, last transmission to the utility company's central office.

The data and control signals are exchanged between microprocessor circuit 55 and input/output port circuitry 90 which is also a buffer for transmitting compatible signals to phone dialer circuitry 105 that drives touch tone transmitter circuit 110 and line catching relay means 120 to access the telephone line to either send data or a tamper alarm.

A tone decoder circuit 130 is designed to sense a coded signal generated by the central office and provides the necessary hand shake signals that inform microprocessor circuit 55 that the data transmitted has been received, or that the data should be retransmitted later.

Phone line coupler circuit 140 insures that the signal characteristics are compatible with the telephone public network voltages.

Display means 150 are connected to input/output circuit 90 so that a user, or a meter reader, may also read the KW hour consumption at any time.

A personal computer 160 may also be interfaced to I/0 circuit 90 to allow a user to access certain unprotected information in the computer.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A device for reading and transmitting through the user's telephone lines the electrical energy consumption, at predetermined time intervals, comprising:
   A. means for sensing the current intensity and voltage being delivered to a user;
   B. analog to digital converter means connected to the output of said current and voltage sensing means so that digital outputs are produced for the magnitude said voltage and said current intensity;
   C. microprocessor means having inputs connected to said digital outputs and including sufficient software means to maintain a real time clock and a program for computing the energy comsumption from said digital outputs over said intervals;
   D. memory means for storing the necessary parameters for making said computations;
   E. automatic modem means for dialing the central office's telephone number in response to a signal from said microprocessor means and said modem means adapted to transmit data from said microprocessor means after the connection with the central office telephone is established;
   F. display means connected to said microprocess or means to continuously monitor the energy consumption by the user;
   G. means for sensing tampering with said device and connected to said microprocessor means so that a tampering signal is transmitted to the central office; and
   H. phase sensor means for measuring the phase angle between said current intensity and voltage and having an output that is connected to said analog to digital converter means so that another input is provided to said microprocessor means to compute the apparent power.

* * * * *